Sept. 29, 1964 L. COFFIN ET AL 3,151,033
LOADING-UNLOADING DEVICE FOR NUCLEAR REACTOR
Filed Oct. 24, 1962 3 Sheets-Sheet 1

Sept. 29, 1964 L. COFFIN ET AL 3,151,033
LOADING-UNLOADING DEVICE FOR NUCLEAR REACTOR
Filed Oct. 24, 1962 3 Sheets-Sheet 2

_United States Patent Office_

3,151,033
Patented Sept. 29, 1964

3,151,033
LOADING-UNLOADING DEVICE FOR
NUCLEAR REACTOR
Lucien Coffin, Levallois, and Camille Le Feuvre, Paris,
France, assignors to L'Electricite de France (Service
National)
Filed Oct. 24, 1962, Ser. No. 232,825
Claims priority, application France, Nov. 15, 1961,
879,079
10 Claims. (Cl. 176—30)

The present invention relates to a fuel charging and discharging device, more particularly for an atomic reactor, comprising a series of vertical channels occupied by fuel elements.

The device according to the invention is of the type currently called "charging arm," comprising a conduit extending from the exterior of the reactor to opposite the channel to be treated through a well provided in the enclosure of the reactor. This conduit comprises a top part, formed by an axial tube passing through the enclosure and extended by a pivot for centering the device, and a bottom part formed by an oscillating arm adapted to be brought opposite each of the channels served by the well considered and connecting the axial tube to the mouth of the channel to be treated. The transit of the elements between the channel and a principal machine mounted on the well is ensured by mechanical or pneumatic means.

The operating device effecting the opening of the oscillating arm on a channel must be designed so that closure occurs with absolute security: in fact, jamming of the arm in the extended position would prevent its removal through the well. Finally, since the oscillating arm has a constant length, it is preferable to provide a vertical clearance of the arm sufficient to permit it to be applied to any channel.

The present invention relates more particularly to the provision of a charging device, with absolute certainty of operation, due to the automatic falling back of the oscillating arm under the action of its own weight as soon as the device is raised, irrespective of the previous spread of the said arm.

According to the present invention there is provided a fuel charging and discharging device, more particularly for an atomic reactor, comprising wells or standpipes passing through the enclosure or pressure vessel of the reactor and serving a certain number of channels in the core, which receive the fuel elements and open at points situated substantially on concentric circles, the said device comprising a conduit comprising in series an axial tube inserted into the well and an oscillating arm adapted to be brought opposite each of the channels by a rod pivoted to the arm and to a pivot assembly extending the axial tube and engaging a recess integral with the reactor core for centering the device, characterised in that the pivot assembly comprises a sleeve to which is pivoted the rod and a supporting part having a connection with play with the axial tube, and in that the sleeve is supported on the supporting part either directly or by means of detachable stops, the relative positions of the sleeve and said supporting part determining the amplitude of angular opening of the oscillating arm consecutively to the axial tube coming into its closest position to the pivot assembly permitted by the connection with play.

The invention is illustrated by way of example in the accompanying drawings, wherein:

FIG. 3 is a part view in section of the arm, the parts being shown in the positions which they occupy when the arm is supported by the raising and lowering mechanism in the raised position;

Figure 1:
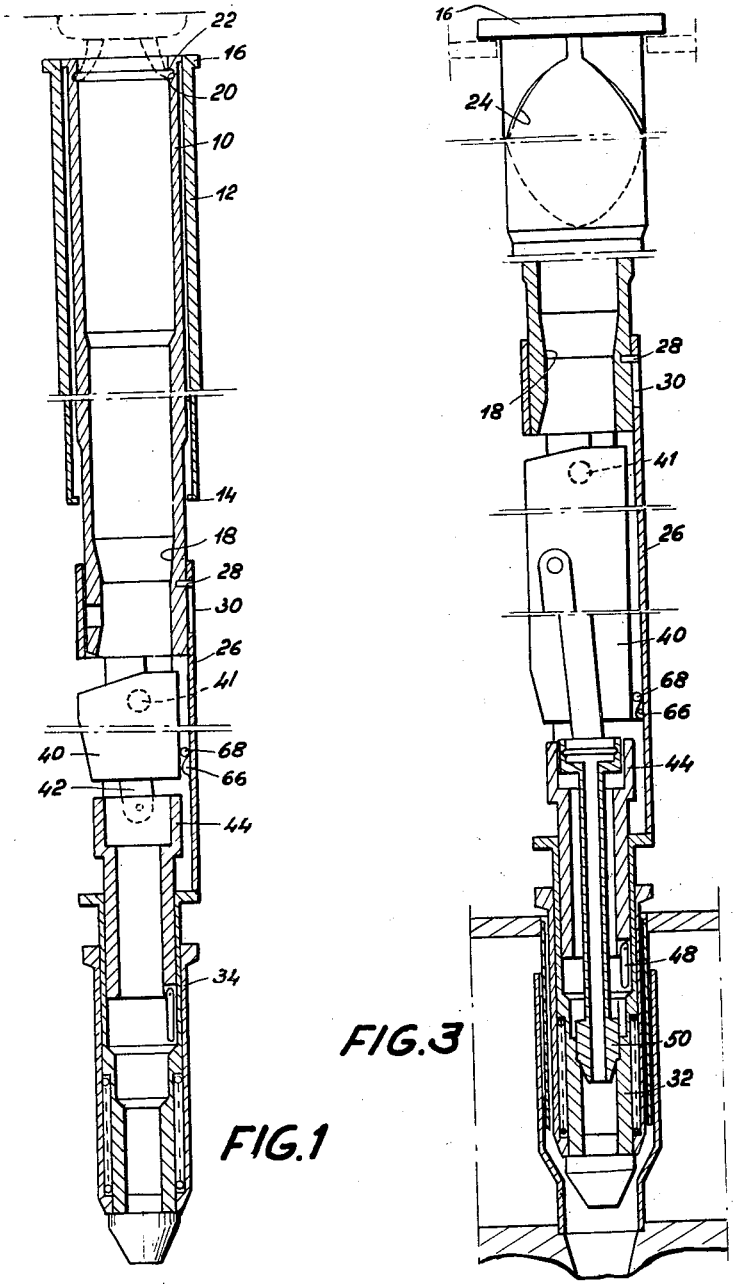
FIG. 1 is a sectional view of a charging arm forming one embodiment of the invention, the parts being shown in the positions which they occupy when the arm is supported by a grab.

The charging arm comprises a top part shown in FIG. 1, formed by an inner telescopic tube 10 and an outer telescopic tube 12. The outer telescopic tube 12, of constant internal diameter, is terminated in its lower part by a keyed collar 14 sliding on the tube 10. In its upper part, the tube 12 has an external flange 16 bearing against a mechanism for raising and lowering the arm. The bore of the inner tube 10 has a constricted part 18 serving as support for provisional stoppers for biological protection, and in the upper part, a handling groove 20, permitting the manipulation of the tube 10 by means of a grab shown diagrammatically in dash lines. The inner telescopic tube 10 is also provided with an upper flange 22, coming into contact with the collar 14 when the arm is extended. The outer wall of the tube 12 has an oblique shoulder 24 (FIG. 2), ensuring automatic orientation of the arm when the latter is placed in position.

Figure 2:
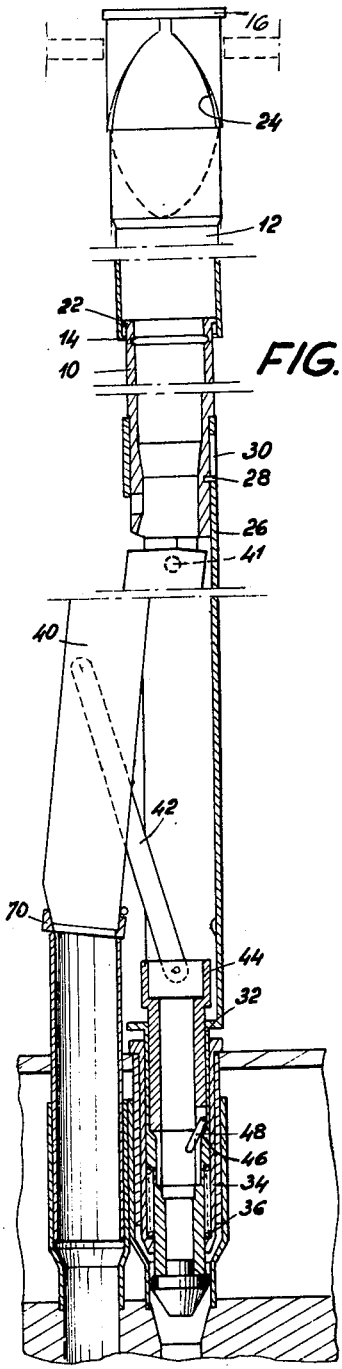
FIG. 2 is a view in section of the arm shown lowered on to a channel belonging to the inner circle.

In its lower part, the inner tube 10 engages a support 26 having a U-shaped right section, to which it is connected by a sliding key having a predetermined clearance for ensuring the opening of the arm when the outer telescopic tube 12 is released by the lowering mechanism (as shown in FIG. 2, in which the mechanism is shown in dash lines) and ceases to support the inner tube 10. The tube 10 bears on the support after having travelled the distance of the play provided by the key connection; the latter is formed for example by a key 28 carried by the tube 10 and engaged in a slot 30 in the support 26.

The U-shaped support 26 is terminated in its lower part by a pivot 32 enclosed in a casing 34. During the descent of the arm, a spring 36 maintains the casing abutted against a shoulder 38 of the pivot. As long as the pivot does not bear on a recess, which will be described later, the sliding key connection 28, 30 retains the support 26, as shown in FIG. 3.

The fuel elements travel through the inner tube 10 and an oscillating tube 40 hinged to the tube 10 by means of pivots 41.

One or more spreading rods 42 of the arm are linked by one end to the oscillating tube 40 and by the other end to a sleeve 44 sliding in the pivot 32.

Figure 4:
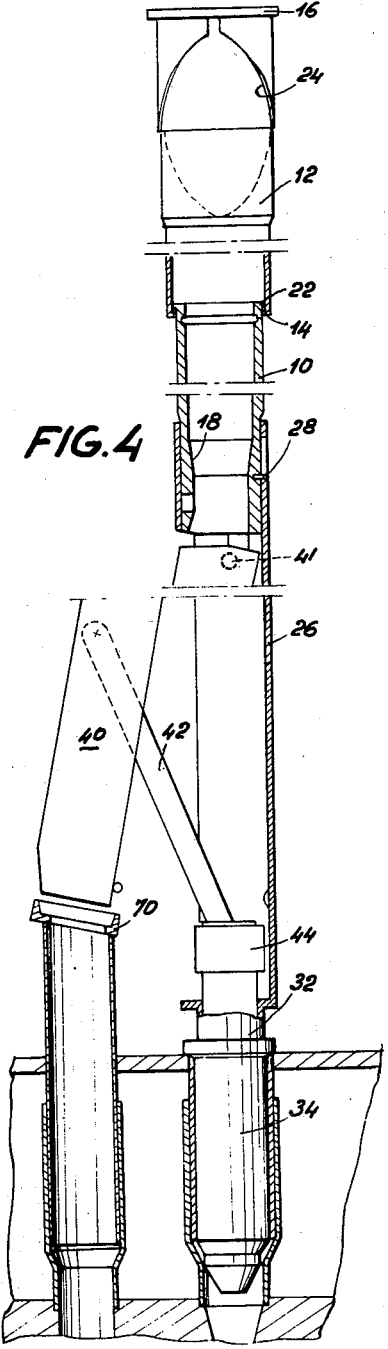
FIG. 4 is a sectional view of the arm shown open over a channel belonging to an outer circle, before being lowered.
Figure 5:
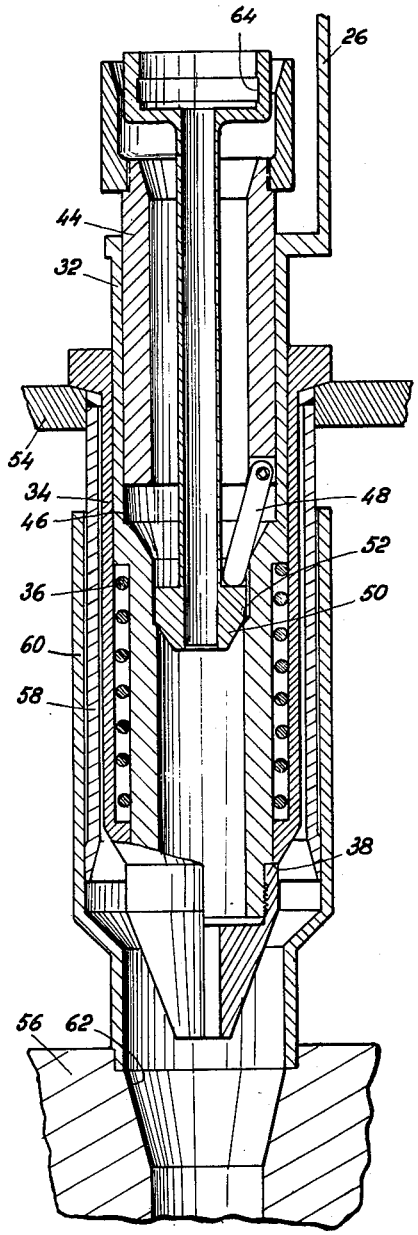
FIG. 5 is a detail view on a larger scale showing in section the pivot of the arm shown in FIG. 4.

The position of the sleeve 44 in the pivot 32 when the oscillating arm is carried by the sleeve is determined either by the abutment of the sleeve against an inner shoulder 46 of the pivot 32 (FIG. 2) or by the abutment of a series of catches 48 (generally three) carried by the sleeve 44 against a stop 50 bearing against an inner shoulder 52 of the pivot (FIG. 4 or 5). Stops of different lengths are provided for modifying the relative positions of the sleeve and pivot. A given angular spacing of the oscillating tube 40 and of the support 26 corresponds to each relative position; it is thus possible to serve several concentric rows of channels.

The catches 48 are suspended from pins carried by the sleeve 44 and are retracted laterallly as soon as the sleeve is lifted relative to the pivot 32. This lifting occurs when the lowering mechanism brings the arm into the position shown in FIG. 3; the inner telescopic tube 10 then alone carries the oscillating arm from which the sleeve 44 is suspended.

The pivot 34 extending the support 26, during the descent of the charging arm, engages an orifice provided in a plate 54 ensuring the centering of the arm (FIG. 5). This plate is generally separated from the core 56 of the reactor by an interval, through which pass the pipes. An inner skirt 58 welded to the plate 54 engages an outer skirt 60 integral with the core and eventually prolongs a channel 62. The expansions of the core are thus compensated by the relative movement of the skirts 58 and 60. Removal and replacement of the stop 50 are effected by means of a grab engaging a groove 64 of the stop. The catches 48 are then retracted in the thickness of the sleeve, and therefore they do not oppose the movements of the stop.

To facilitate the opening or spreading of the arm when the raising and lowering drive lowers the flange 16 from the position of FIG. 3 to that of FIG. 4, there is provided on the inner face of the U tube an inclined plane 66, which throws outwardly a roller 68 of the oscillating arm 40. Once the arm is in the position shown in FIG. 4, additional lowering brings the end of the arm 40 into contact with a guide 70 terminating the corresponding channel of the reactor.

The handling of the fuel elements contained in a channel necessitates successively the putting into position of the arm, then its lowering on to the channel. The charging arm provided with provisional stoppers is positioned on the well by a service machine, not shown: the arm, suspended from a grab, is lowered, bent back and closed, into the well (FIG. 1). The oblique shoulder 24 of the outer telescopic tube 12 orients the arm suitably on its driving key in the course of its descent, limited by abutment of the upper flange 16 against the raising and lowering drive, shown diagrammatically in dash lines in FIG. 3; this drive is then in the top position. The terminal cone of the pivot 32 initiates centering of the pivot in the skirt 58 in the course of the descent of the arm and permits a certain margin of error in positioning. When the upper collar of the sleeve 34 bears against the plate 54, the grab is unlocked and then withdrawn. The service machine is replaced by a principal charging and discharging machine which removes the biological protection stoppers resting on the constriction 18 of the inner tube 10.

The descent of the lowering drive from the position of FIG. 3 to that of FIG. 2 permits the downward movement of the tubes 12 and 10 and of the upper joint of the arm 40, formed by the pivots 41 carried by the tube 10.

In a first stage (opening or spreading of the oscillating arm), the tubes 10 and 12, supported by the raising and lowering mechanism, descend by a length equal to the play provided by the slot 39. If there is no stop in position in the pivot, the sleeve 44 is rendered stationary as soon as it abuts against the shoulder 46, this abutment being arranged to occur before the complete travel of the play provided by the slot 30. Since the sleeve is retained by its bearing against the pivot rendered stationary by the spring 36, the link system formed by the rod 42 and the oscillating arm 40 opens and the latter comes opposite a channel of the inner circle for a suitable orientation of the whole of the arm.

In a second stage (lowering of the oscillating arm) the mechanism is brought into the position shown diagrammatically in FIG. 2 and releases the outer tube 12, the lower collar 14 of which leaves the flange 22. The tube 10, being no longer supported by the tube 12, bears on the support 26; the spring 36, subjected to the weight of the support 26 and of the oscillating arm 40 is then compressed by an amount sufficient for the arm 40 to bear on the guide 70 (FIG. 2).

The spring must obviously have a maximum compression stroke at least equal to the length of lowering, that is to say, to the distance from the end of the oscillating arm to the face opposite the guide at the end of the first stage.

The swing of the oscillating arm 40 is initiated by the rolling of the roller 68 on the inclined plane 66. The risk of jamming of the oscillating arm against the rod is thus avoided.

One of the ends of the rods 42 is advantageously provided with double-acting springs allowing a certain margin of opening for the oscillating tube 40, so as to ensure correct centering despite possible erros of alignment.

For orienting the oscillating arm 40 on another channel belonging to the same circle, the tube 12 is raised by means of the lowering drive; return of this drive into the position of FIG. 3 re-closes the arm which may be oriented. During this orientation, the pivot is not subjected to any thrust and it has not been provided with a thrust bearing. Once the arm has been re-oriented, it is merely necessary to lower it for it to open with the same spread as before.

For producing the opening of the oscillating arm on an outer circle, the entire arm is raised by means of the lowering mechanism and a stop 50, the height of which determines the ultimate angular opening or spread of the arm, is taken up by the principal machine and lowered into the pivot by the grab; the three catches 48 are in the thickness of the sleeve and release the passage necessary for the stop. The arm is oriented in the direction of the selected channel and lowered. The sleeve 44 descends in the pivot to a position for which the catches 48 bear against the stop 50; the sleeve being then higher than in the case of the absence of a stop, it gives a greater angular opening to the oscillating tube. The same operations as in the case of the inner circle permit the channel in the new circle to be changed. For changing circle, it is merely necessary to change the stop, the arm being in the top position; although any number of stops is theoretically possible, for constructional reasons two stops are generally used, permitting channels on two circles to be served.

When the treatment of the channels is terminated, the stop in position is withdrawn by means of the grab and deposited in the principal machine. The protection stops are replaced in the tube 10. The principal machine is replaced by the service machine and the arm is removed.

It should be noted that the oscillating tube 40 recloses at each change of channel or circle, as soon as the arm is raised, and cannot therefore remain locked in the open position, even if a stop remains wedged in the pivot.

Security of operation is therefore absolute.

The junction between the oscillating arm and the guide, subjected to the major part of the weight of the tube 10 and of the oscillating arm 40, may be designed to ensure a good seal.

We claim:

1. A fuel charging and discharging device for a nuclear reactor of the type having a core formed with channels for reception of fuel elements which channels open at points arranged substantially on concentric circles, the core being enclosed in a pressure vessel provided with standpipes for access to the core, said device comprising a conduit including, in series, an axial tube adapted to be inserted into a standpipe and an oscillating tube mounted on said axial tube adapted to be brought opposite each of the channels served by the standpipe, a rod pivoted to said oscillating tube, a pivot assembly in alignment with said axial tube and adapted to engage a recess in the reactor core for centering said device, said assembly comprising a sleeve, said rod being pivotally connected to said sleeve, and a support for said sleeve, means connecting said support with axial play to said axial tube and a movable stop between said sleeve and said support, the relative positions of said sleeve and said support determining the amplitude of angular opening of said oscillating tube with respect to said axial tube, said axial tube moving toward said pivot assembly through said connecting means.

2. A device as described in claim 1 including a lower end for said sleeve, a shoulder in said support and a stop insertable in said support, said end resting on said shoulder in the absence of said stop.

3. A device as described in claim 2 including retractable catches on said sleeve engaging said stop, said catches being retractable by raising said sleeve, said catches engaging said stop before engagement of said lower end of said sleeve and said shoulder.

4. A device as described in claim 3, said catches being mounted on pins carried by said sleeves, said catches retracting into said sleeve by gravity when said sleeve is raised.

5. A device as described in claim 4 including an inclined plane in said support directing said catches toward said stop on lowering of said sleeve.

6. A device as described in claim 2, said stop having an extension projecting from said sleeve and a groove in said extension engageable by a grab.

7. A device as described in claim 1, said pivot assembly including a casing and means for resiliently holding said casing in a predetermined axial position relative to said support.

8. A device as described in claim 7, said resilient means including a spring between said support and said casing, a shoulder on said support and a shoulder on said casing, said spring being compressed between said shoulders.

9. A device as described in claim 8, said connecting means with axial play providing sufficient clearance for return of said oscillating tube from maximum distance from said pivot assembly.

10. A fuel charging and discharging device for a nuclear reactor of the type having a core formed with channels for reception of fuel elements which channels open at points arranged substantially on concentric circles, the core being enclosed in a pressure vessel provided with standpipes for access to the core, said device comprising a conduit including, in series, an axial tube adapted to be inserted into a standpipe and an oscillating tube, a swivel connection between said oscillating tube and said axial tube, a pivot assembly including a support, a connection with axial play between said support and said axial tube, a sleeve carried by said support, a removable stop between said sleeve and said support, and rod means rotatably connected to said sleeve and to said oscillating tube, the relative position of said sleeve and said support determining the amplitude of angular opening of said oscillating tube with respect to said axial tube, said axial tube moving toward said pivot assembly through said connecting means.

References Cited in the file of this patent

UNITED STATES PATENTS

| | | |
|---|---|---|
| 2,930,744 | Shillitto et al. | Mar. 29, 1960 |
| 3,035,994 | Sutherland | May 22, 1962 |

FOREIGN PATENTS

| | | |
|---|---|---|
| 868,021 | Great Britain | May 17, 1961 |